United States Patent [19]
Wada et al.

[11] 4,317,170
[45] Feb. 23, 1982

[54] MICROINSTRUCTION CONTROLLED DATA PROCESSING SYSTEM INCLUDING MICRO-INSTRUCTIONS WITH DATA ALIGN CONTROL FEATURE

[75] Inventors: Kenichi Wada, Zama; Mamoru Hinai, Hadano, both of Japan

[73] Assignee: Hitachi, Ltd., Tokyo, Japan

[21] Appl. No.: 79,247

[22] Filed: Sep. 27, 1979

[30] Foreign Application Priority Data

Jan. 19, 1979 [JP] Japan .................................. 54/3956

[51] Int. Cl.³ .......................... G06F 9/00; G06F 9/22; G06F 9/34; G06F 9/28
[52] U.S. Cl. .................................................. 364/200
[58] Field of Search ... 364/200 MS File, 900 MS File

[56] References Cited
U.S. PATENT DOCUMENTS

| | | | |
|---|---|---|---|
| 3,840,861 | 10/1974 | Amdahl et al. | 364/200 |
| 3,858,183 | 12/1974 | Amdahl et al. | 364/200 |
| 4,087,854 | 5/1978 | Kinoshita et al. | 364/200 |

Primary Examiner—Joseph M. Thesz
Assistant Examiner—John G. Mills
Attorney, Agent, or Firm—Craig and Antonelli

[57] ABSTRACT

Disclosed is a data processing system comprising means for storing a plurality of macroinstructions and data, means for determining a starting address of data participating in practice of a macroinstruction read out from the storing means and the entire length of said data in response to said read-out macroinstruction and reading out said data from said storing means based on the thus determined address and entire length, means for shifting the read-out data by a quantity determined by said macroinstruction and means for masking a part, determined by said macroinstruction, of said shifted data, wherein practice of macroinstructions is controlled by a microinstruction sequence, an align field is disposed for these microinstructions to control said read-out means, shifting means and masking means, said shifting means is arranged so that said shifting quantity is determined in response to said starting address and said align field, and means for putting out mask pattern signals indicating the position of data to be masked in response to said entire length of data, said starting address and said align field is disposed in said masking means.

12 Claims, 10 Drawing Figures

| ALIGN FIELD | DECODER 98 | SELECTOR 910 | SELECTOR 932 | SELECTOR 936 | SELECTOR 930 | SELECTOR 960 | NOTES |
|---|---|---|---|---|---|---|---|
| 0000 | "*" | "*" | "*" | "*" | "*" | "*" | WORD OVERLAP PROCESSING |
| 0001 | "0" | 913A | "*" | "*" | "Y" | 962A | |
| 0010 | "0" | "0" | "Y" | "-X" | "Y-X" | " | TR INSTRUCTION |
| 0011 | "0" | "0" | "Y" | "13" | "Y+13" | " | NI INSTRUCTION |
| 0100 | "0" | "0" | "Y" | "*" | "Y" | " | MVC INSTRUCTION |
| 0101 | "0" | 911A | "Y" | "-X" | "Y-X" | 966A | INTERRUPTION PROCESSING |
| 0110 | "0" | 919A | "Y" | "*" | "Y" | 962A | |
| 0111 | "0" | 72A | "X" | "*" | "Y" | " | |
| 1000 | "0" | " | "Y" | "*" | "X" | " | |
| 1001 | "0" | 911A | "Y" | "*" | "Y" | " | NC/OC INSTRUCTION |
| 1010 | "0" | 913A | "Y" | "*" | "Y" | " | ED INSTRUCTION |
| 1011 | "0" | 72A | "*" | "*" | "Z" | " | |
| 1100 | "1" | 919A | "Y" | "9" | "Y+9" | 964A | |
| 1101 | "1" | 915A | "X" | "9" | "X+9" | " | AP/SP INSTRUCTION |
| 1110 | "1" | 917A | "Y" | "9" | "Y+9" | " | AP/SP INSTRUCTION |
| 1111 | "1" | "0" | "Y" | "9" | "Y+9" | " | MVO INSTRUCTION |

*: DON'T CARE

MICROINSTRUCTION CONTROLLED DATA PROCESSING SYSTEM INCLUDING MICRO-INSTRUCTIONS WITH DATA ALIGN CONTROL FEATURE

BACKGROUND OF THE INVENTION

The present invention relates to a data processing system such as a digital computer. More particularly, the invention relates to a microinstruction controlled data processing system.

In conventional digital computers, the macroinstruction to be executed next is read out from a memory in which macroinstructions and data are stored, and an address for specifying data to be used for the execution of this macroinstruction is determined by an instruction unit. Based on this data address, corresponding data is read out from the above-mentioned memory and the macroinstruction is executed by an operation unit. The data read out from the memory at one time has a predetermined length, for example, a length of 8 bytes. Readout of data from the memory is not performed on data of bytes starting from an optional address position, but read-out is performed on data of a length of 8 bytes from the boundary position between two blocks, each including 8 bytes. Accordingly, when data to be read out is located on both sides of this boundary position, even if the length of the desired data is shorter than 8 bytes, the read-out operation is conducted twice. More specifically, 8 bytes having an address smaller than the boundary position and 8 bytes having an address larger than the boundary position are read out, respectively. Positioning of the 8-byte data is performed by using an arithmetic unit so that the desired 8-byte data can be picked out from these two groups of 8-byte data. Since positioning of data and pick-up of data are performed by using an arithmetic unit, a long processing time is necessary. Accordingly, the instruction processing time is prolonged. Data processing systems in which positioning and pick-up of data are performed exclusively by a wired logic circuit (hereinafter referred to as "data converter") so as to eliminate the above-mentioned defect are proposed in the following literature references:

1. Specification of U.S. Pat. No. 3,858,183
2. Japanese Patent Application Laid-Open Specification No. 94133/78

In the former data processing system, data of 8 bytes including desired data of 4 bytes is read out from a memory, positioning of the read-out 8-byte data is performed by a data converter, and the desired data of 4 bytes is then picked up. In the latter data processing system, positioning of data of 16 bytes including desired data of up to 8 bytes is performed by using a data converter, and the desired data of a length of up to 8 bytes is picked up.

If positioning and pick-up of optional data are performed by using the data converter, the instruction processing time can be shortened. However, since it is necessary to perform positioning and pick-up of data while various instructions are being executed, the control circuit for the converter should inevitably be complicated. Moreover, the timing and procedures for performing positioning and pick-up of data differ depending on the respective instruction. Accordingly, the control circuit should be arranged so that the desired operation should be performed at a predetermined timing for each instruction while it is executed, and hence, the structure of the converter will inevitably be drastically complicated.

SUMMARY OF THE INVENTION

It is a primary object of the present invention to provide a data processing system in which the above-mentioned problems involved in the conventional techniques are solved and a very simple circuit is provided for controlling a data converter which performs positioning and pick-up of data.

More specifically, the object of the present invention is to provide a data processing system comprising a microinstruction controlled data converter.

It is noted that in the recent development of large-size computers, processing of macroinstructions is controlled by microinstructions and therefore if control of the data converter can be performed by microinstructions, the control of a computer including the data converter will be performed by using a common microinstruction memory device and the structure of the system will be simplified and the above-mentioned object will be conveniently attained.

More specifically, in accordance with the present invention, there is provided a data processing system with an apparatus for storing a plurality of macroinstructions along with the data, as well as apparatus for determining a starting address of data participating in the execution of a macroinstruction read out from the storing means and the entire length of the data in response to the readout macroinstructions. The stored data based on the thus determined address and the entire field length is read out and shifted by a quantity determined by the macroinstruction. Apparatus is also provided for masking a part, determined by said macroinstruction, of said shifted data, wherein execution of macroinstructions is controlled by a microinstruction sequence. An align field is disposed for these microinstructions to control the read-out, shifting and masking apparatus, with the shifting apparatus being arranged so that the shifting quantity is determined in response to the starting address and the align field. A mask pattern signal indicates the position of data to be masked in response to the entire length of data with the starting address and the aligned field being disposed in the masking means.

DETAILED DESCRIPTION OF THE PREFERRED EMBODIMENT

The present embodiment is applicable to the electronic computer System/370 Model manufactured by International Business Machines Corporation, and the operation of this system is sufficiently explained in "Principles of Operation of IBM System/370" published by said company. Accordingly, explanation of the operation of this system will be omitted in the description given hereinafter unless particularly necessary. Furthermore, terms used in the above reference are used without particular explanation unless necessary.

Figure 1:
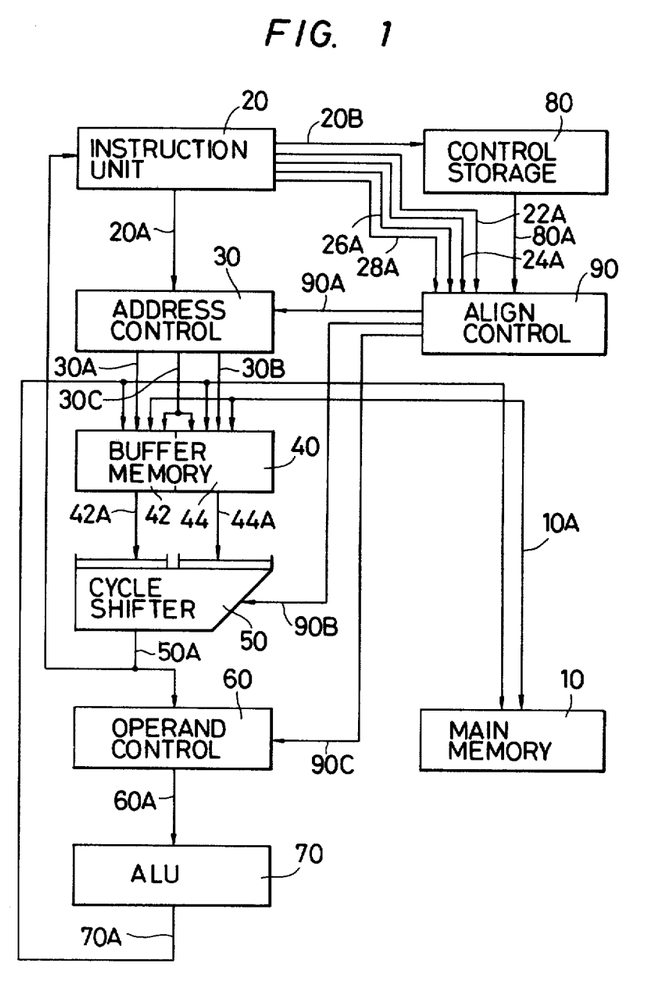
FIG. 1 is a diagram illustrating the circuit structure in the data processing system of the present invention.
Figure 2:
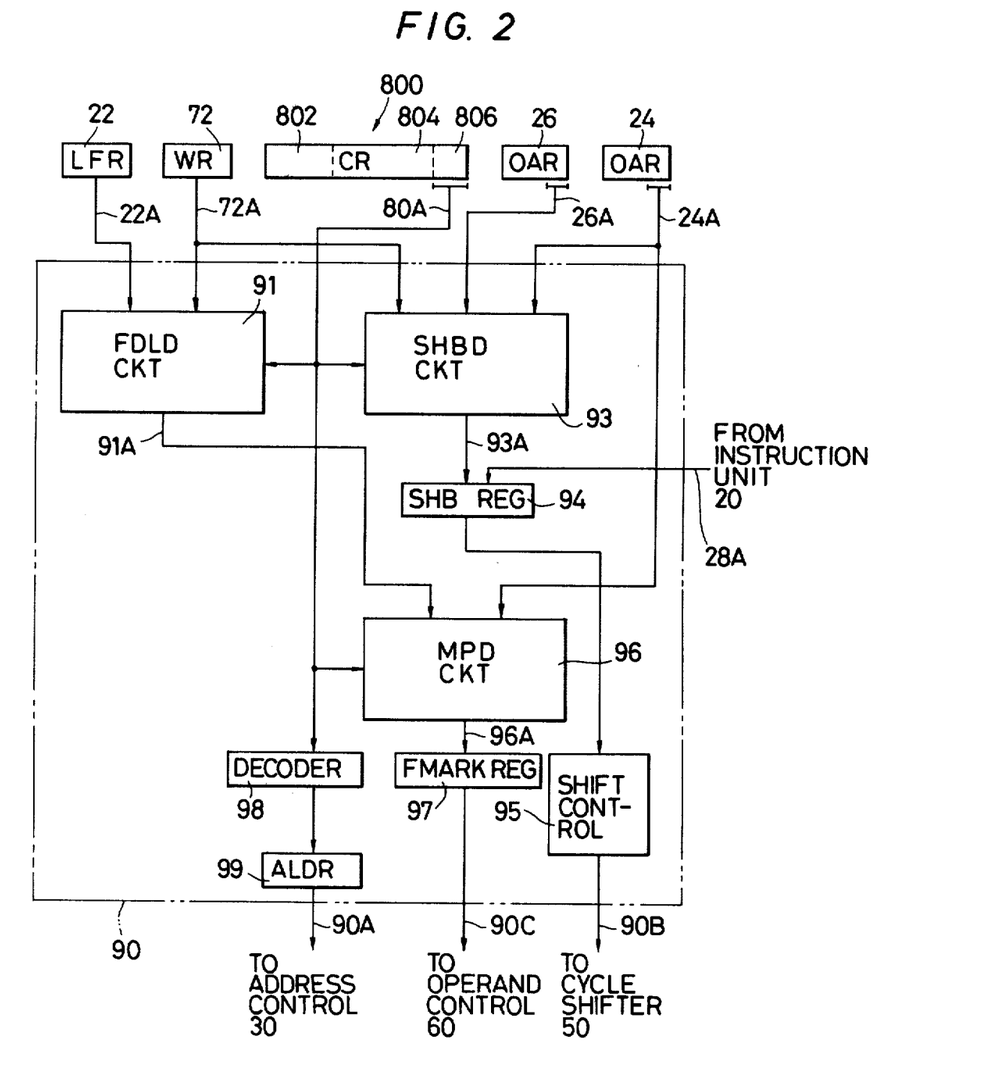
FIG. 2 is a block circuit diagram illustrating in detail the align control and related circuit elements in the circuit shown in FIG. 1.

Referring to FIG. 1, a plurality of macroinstructions and a plurality of data are stored in a main memory 10 and a buffer memory 40. An instruction unit 20 sends a virtual address of 32 bits for reading out a macroinstruction to be executed from the buffer memory 40, to an address control 30 through a line 20A. In response to this virtual address, the address control 30 sends out a physical address of 32 bits to the buffer memory 40 on a line 30A or 30B. The buffer memory 40 includes two banks, that is, a first bank 42 and a second bank 44. In response to the physical addresses on the lines 30A and 30B, the first and second banks 42 and 44 send out memory informations of a length of 8 bytes on lines 42A and 42B, respectively. When the macroinstruction to be read out is stored in the first bank 42 of the buffer memory 40, cycle shifter 50 of a 16-byte length makes no shifting operation, but the macroinstruction put out from the first bank 42 is sent to the instruction unit 20 through a line 50A. When the macroinstruction to be read out is stored in the second bank 44, the cycle shifter 50 performs the shifting operation to the left by a quantity corresponding to up to 8 bytes, whereby the macroinstruction put out from the second bank 44 is fed to the instruction unit 20 through the line 50A. The quantity of shifting by the cycle shifter 50 on reading out the macroinstruction is fed to an align control 90 through a line 28A by the instruction unit 20. As shown in FIG. 2, the align control 90 stores this shifting quantity in a shift byte number register 94 (SHBREG), and a signal instructing a corresponding shifting operation is fed to the cycle shifter 50 through a line 90B by a shift control circuit 95.

When a predetermined macroinstruction is not stored in the buffer memory 40, this macroinstruction is transferred from the main memory 10 having a capacity of 4 megabytes to the buffer memory 40 through a line 10A and the macroinstruction is processed in the same manner as described above. All the addresses for access to the main memory 10 are supplied from output lines 30A through 30C of the address control 30. For simplification, address lines to the main memory are omitted in FIG. 1.

The instruction unit 20 decodes whether or not the macroinstruction to be executed next is one macroinstruction and whether the macroinstruction to be practiced next is macroinstruction for emitting a read-out request and a write-in request to the main memory (hereinafter referred to as "instructions SS").

For example, a macroinstruction such as AND CHARACTER instruction, OR CHARACTER instruction, EXCLUSIVE-OR CHARACTER INSTRUCTION or a decimal operational instruction reads out first and second data from first and second addresses of the main memory 10 and performs the predetermined operation, and then, it stores the results of the operation in the first address of the main memory. Furthermore, MVC instruction reads out data from the first address of the main memory 10 and stores said data in the second address.

When it is confirmed from results of decoding that the macroinstruction to be executed next is an instruction SS, the starting virtual address of data to be read out (hereinafter referred to as "second operand virtual address") and the starting virtual address of data to be stored (hereinafter referred to as "first operand virtual address") are determined based on address informations in the macroinstruction. Furthermore, the instruction unit determines the total length LF of this data based on length informations included in the macroinstruction. These addresses include 32 bits, and the total length LF of the data includes 8 bits. The first and second operand addresses and the data entire length LF are stored in first and second operand address registers 24 and 26 (OAR) (see FIG. 2) and a length field register 22 (LFR) (see FIG. 2), respectively.

By the starting address of data is meant a lower value (hereinafter referred to as "leftmost address") or larger value (hereinafter referred to as "rightmost address") of data-stipulating addresses on both the ends of data. The starting address is determined by the instruction. For example, in the case of the decimal operational instruction, the starting address is the rightmost address, and in case of other instructions SS, the starting address is the leftmost address.

The second operand virtual address is first supplied from the instruction unit 20 to the address control 30 through the line 20A, and the lower 4 bits of the first and second operand virtual addresses and the data entire length are fed from instruction unit 20 to the align control 90 through lines 24A, 26A and 22A, respectively. On the other hand, the instruction unit 20 feeds out the operation code (OP code) in macroinstructions to a control storage 80 through a line 20B. This control storage 80 sequentially reads out microinstructions in the microinstruction sequence appointed by this OP code, and controls the practice of such macroinstructions. When the control storage 80 reads out a microinstruction, it stores this microinstruction in a control register 800 (CR) disposed in the control storage 80 (see FIG. 2). Each microinstruction comprises a next address field 802 for appointing a microinstruction to be read out next, a control field 804 for indicating control information for practice of the instruction and an align field 806 of 4 bits for positioning and read-out of read-out data. The align control 90 receives this align field 806 through a line 80A and emits control signals to the address control 30, the cycle shifter 50 and the operand control 60 through lines 90A, 90B and 90C, respectively.

Figure 3:
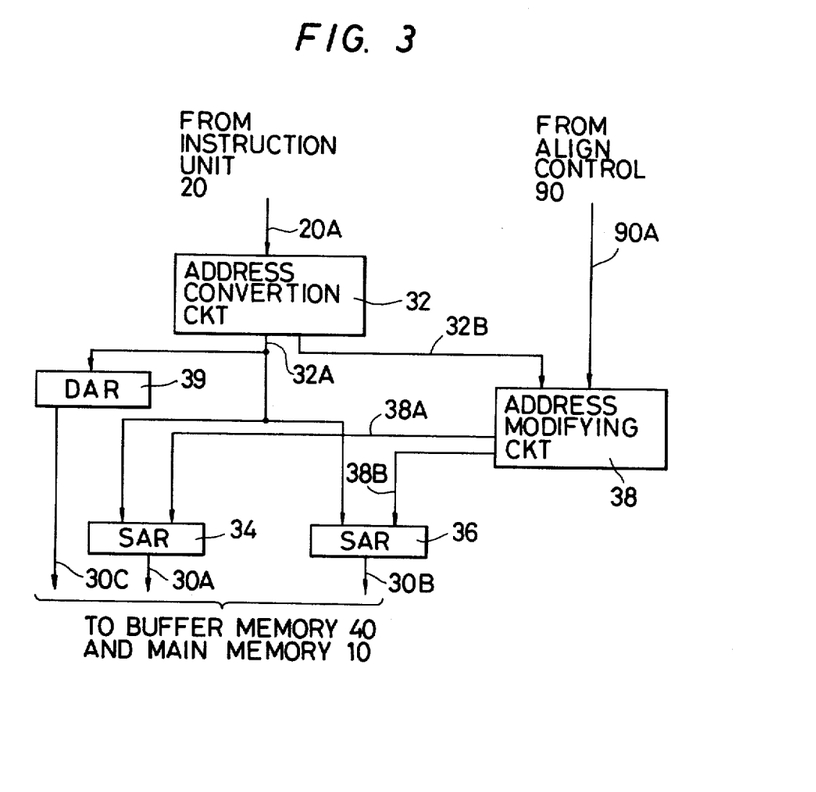
FIG. 3 is a block circuit diagram illustrating in detail the address control in the circuit shown in FIG. 1.
Figure 4:
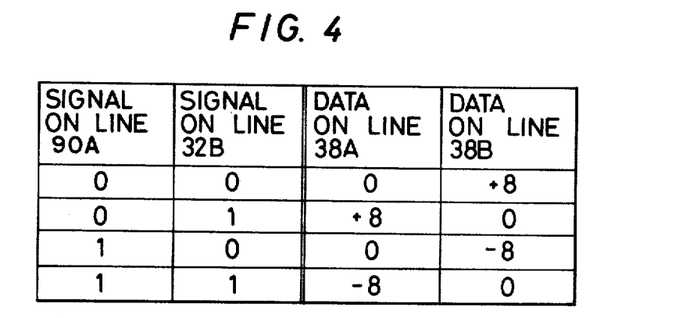
FIG. 4 is a diagram illustrating the address modifying circuit shown in FIG. 3.

As shown in FIG. 2, the align field 806 in the control register 800 is decoded by a decoder 98 in the align control 90, and it is determined whether the operand address stored in the operand address registers 24 and 26 (OAR) is the leftmost address or rightmost address. Since it is already determined by the macroinstruction whether the operand address stored in OAR's 24 and 26 is the leftmost address, if the content of the align field read out by the macroinstruction is preliminarily determined exclusively by the macroinstruction, the above determination becomes possible. For example, in case of decimal operational instructions, if the rightmost address is indicated by the address stored in OAR's 24 and 26, the decoder 98 puts out "1", and in other case, the decoder puts out "0". This output is stored in an align direction register 99 (ALDR). The output of this ALDR 99 is fed to the address control 30 (see FIG. 1) through a line 90A. Details of the address control 30 are illustrated in FIG. 3. The second operand virtual address of 32 bits put in from the operation unit 20 through the line 20A is converted to a corresponding second operand actual address of 32 bits by a known address converting circuit 32 and put in source address registers 34 and 36 (SAR) through a line 32A. On the other hand, the fourth bit from the lowermost bit of this second operand actual address is put in an address modifying circuit 38 through a line 32B. In response to the signal on the line 90A given from the align control 90 and the signal on the line 32B given by the address converting circuit 32, the address modifying circuit 38 puts out binary data of 4 bits indicating "0", "+8" or "−8" on lines 38A and 38B according to the relation shown in FIG. 4, and this data is added to the second operand actual address already stored in SAR's 34 and 36. The specific circuit structure of the address modifying circuit 38 will be apparent to those skilled in the art from FIG. 4. Accordingly, further explanation of this circuit is omitted. In order to perform the above addition, SAR's 34 and 36 are constructed by counters or each of them includes an adder in the interior thereof.

AR's 34 and 36 are used for reading out data of 16 bytes in address regions contiguous to each other, which correspond to data of 8 bytes from the first and second banks 42 and 44.

The operation of the circuit 38 has the following significance.

The first and second banks 42 and 44 of the buffer memory 40 are addressed alternately in units of 8 bytes. More specifically, when addresses are decimally indicated as 0–7, 16–23, 32–29, . . . , data corresponding to such addresses are stored in the first bank 42, and when addresses are decimally indicated as 8–15, 24–31, 40–47, . . . , data corresponding to the addresses are stored in the second bank 44. Accordingly, when these addresses are expressed according to the binary notation, data of addresses in which the fourth bit from the lowermost bit is "0" or "1" (which is put out on the line 32B) are stored in the first bank 42 or second bank 44. Accordingly, when the signal on the line 90A is "0", the address on the line 32A indicates the leftmost address of data to be read out. Therefore, (i) when the signal on the line 32B is "0", the data "0" is put out on the line 38A and the address in SAR 34 is retained at the address on the line 32A, and simultaneously, the data "8" is put out on the line 38B and the address in SAR 36 is set at a value obtained by adding "8" to the address on the line 32A. On the other hand, (ii) when the signal on the line 32B is "1", the data "0" is put out on the line 38B and the address in SAR 36 is retained at the address on the line 32A, and simultaneously, the data "8" is put out on the line 38A and the address in SAR 34 is set at a value obtained by adding "8" to the address on the line 32A. In the above-mentioned manner, addresses for reading out two sets of 8-byte data for constructing continuous data of 16 bytes including data of 8 bytes having the address on the line 32A as the leftmost address, from the first and second banks 42 and 44 of the buffer memory 40, respectively, are stored in SAR's 34 and 36.

On the other hand, when the signal on the line 90A is "1", the address on the line 32A indicates the rightmost address of data to be read out. Therefore, (i) when the signal on the line 32B is "0", the data "0" is put out on the line 38A and the address in SAR 34 is retained at the address on the line 32A, and simultaneously, the data "−8" is put out on the line 38B and the address in SAR 36 is set at a value obtained by adding "−8" to the address on the line 32A. On the other hand, (ii) when the signal on the line 32B is "1", the data "0" is put out on the line 38B and the address in SAR 36 is retained at the address on the line 32A, and simultaneously, the data "−8" is put out on the line 38A and the address in SAR is set at a value obtained by adding "−8" to the address on the line 32A. In the above-mentioned manner, addresses for reading out two sets of 8-byte data for constructing continuous data of 16 bytes including data of 8 bytes having the address on the line 32A as the rightmost address, from the first and second banks 42 and 44 of the buffer memory 40, respectively, are stored in SAR's 34 and 36.

Referring to FIG. 1 again, the outputs of SAR's 34 and 36 read out data of 8 bytes as a whole from the first and second banks 42 and 44 of the buffer memory 40 through the lines 30A and 30B, respectively. In the foregoing manner, data of 16 bytes including data of 8 bytes starting from the first operand actual address are put out from the buffer memory 40 by one read-out operation.

When desired data is not stored in the buffer memory 40, the data is first transferred to the buffer memory 40 from the main memory 10 and then, the above-mentioned read-out operation is performed.

Figure 5:
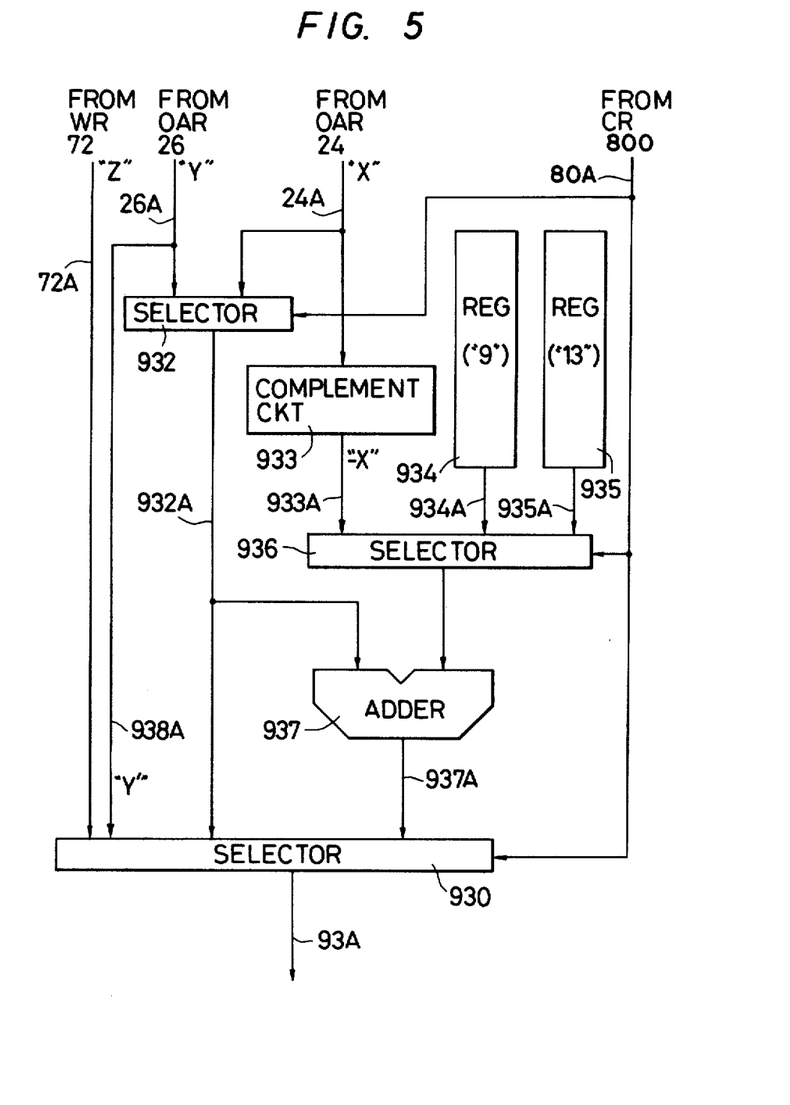
FIG. 5 is a block circuit diagram illustrating in detail the shift byte number determining circuit shown in FIG. 2.
Figure 6:
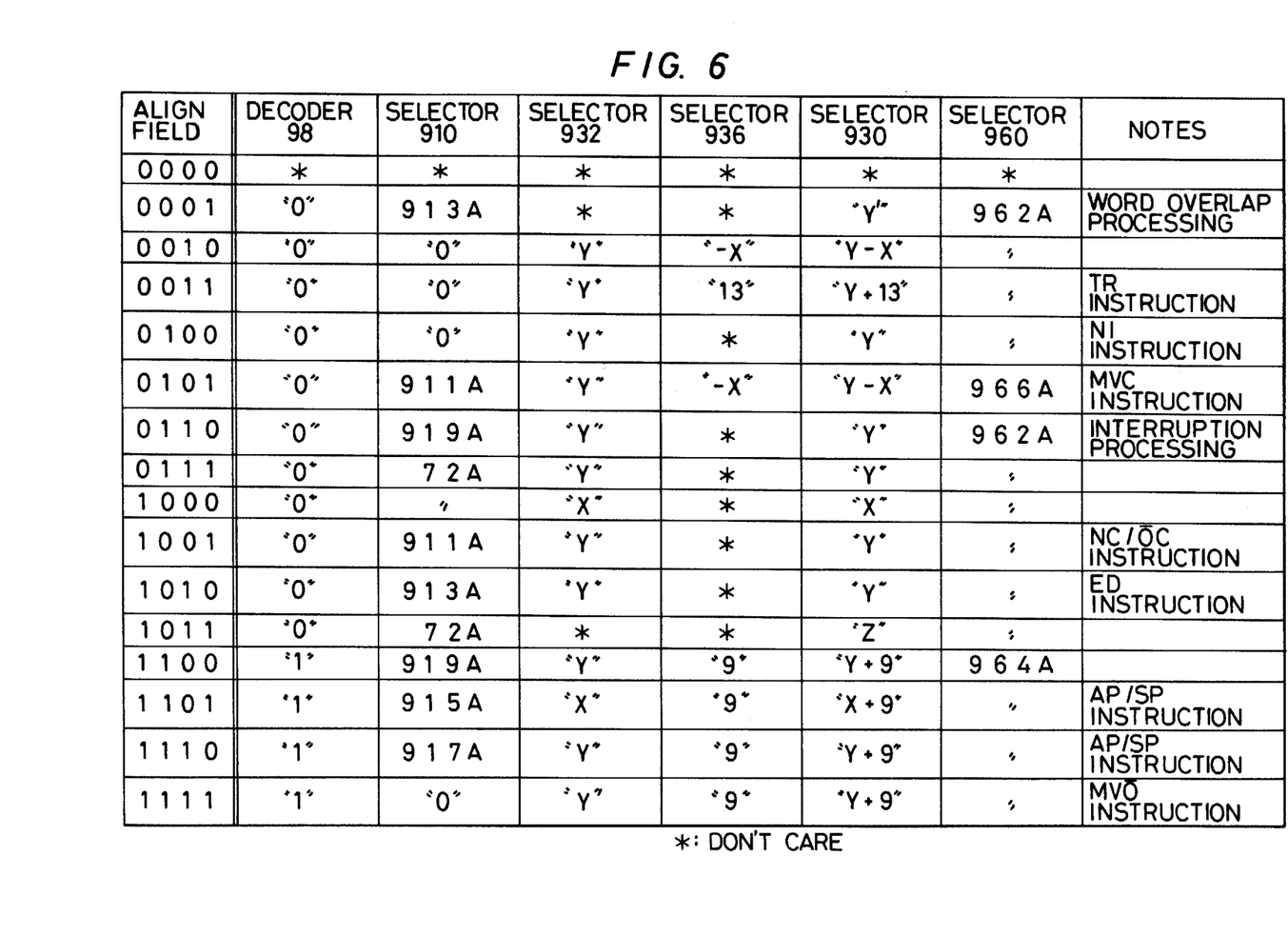
FIG. 6 is a diagram illustrating operations of respective elements in the embodiment shown in FIGS. 1 through 5.

The above-mentioned data of 16 bytes is fed to the cycle shifter 50 through lines 42A and 44A. The cycle shifter 50 cycle-shifts the input data to the left by the byte number determined by a shift control signal fed through a line 90B from the align control 90. This shift control signal is given by a shift control circuit 95 shown in FIG. 2. This circuit 95 receives the output of a shift byte number determining circuit 93 (SHBD CKT) through a shift byte number register 94 (SHB REG) and puts out a corresponding shift control signal. The circuit 93 receives the lower 4 bits of the first and second operand addresses in OAR's 24 and 26 in the instruction unit 20 through lines 24A and 26A, respectively, and the circuit 93 also receives data in a work register 72 (WR) (see FIG. 2) in an arithmetic unit 70 (AIU) (see FIG. 1). Based on this data, the circuit 93 determines the shift byte number under control of the align field 806 in CR 800, which is fed through a line 80A and stores it in SHB REG 94. Details of the circuit 93 are illustrated in FIG. 5. As shown in FIG. 5, the circuit 93 comprises selectors 932, 936 and 930, a complement circuit 933, registers 934 and 935 and an adder 937. The complement circuit 933 puts out a complement of "2" of the data "X" of the lower 4 bits of OAR 24, that is, data "−X", speaking arithmetically. The registers 934 and 935 store binary data corresponding to constants "9" and "13", respectively. The selector 932 selects "X" or "Y" of lower 4 bits of OAR 24 or 26, and the selector 936 selects one of the outputs of the complement circuit 933 and the registers 934 and 935. The adder 937 finds the sum of the outputs of the selectors 932 and 936. The selector 930 selects one of the output "Z" or WR 72, the data "Y" on a line 938A where all the lower 3 bits of the data "Y" on the line 26A are "0", the output of the selector 932 and the output of the adder 937. The operations of these selectors 932, 936 and 930 are controlled by data in the align field 806 in CR 800, which are put in through a line 80A. The relation of the selection operations of these selectors to the align field 806 is as shown in FIG. 6. Incidentally, examples of the use of each align field are also shown in FIG. 6.

When the output of the decoder 98 (see FIG. 2) is "0", the data put out from the selector 930 corresponds to one of "X", "Y", "Y", "Z", "Y−X", "Y+13" and "Y+9" as shown in FIG. 6, and when the output of the decoder 98 (see FIG. 2) is "1", the data put out from the selector 930 corresponds to "Y+9" or "X+9". Accordingly, on processing a certain macroinstruction, the data of the align field in the microinstruction sequence participating in the control of the execution of this macroinstruction may be specified according to FIG. 6 so that the number of bytes desirable for shifting can be put out from the selector 930. This align data, however, should be determined after the selection operation of the selector 960, described hereinafter, has been specified. In FIG. 5, when the data "Z" of WR 72 is selected, if this data "Z" is determined according to need, shifting of an optional number of bytes becomes possible.

Figure 7:
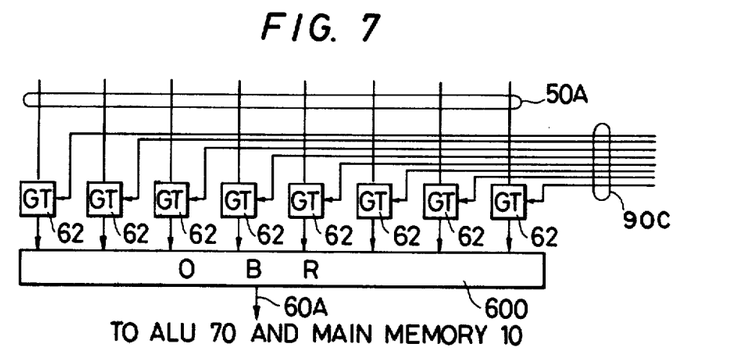
FIG. 7 is a block circuit diagram illustrating in detail the operand control in the circuit shown in FIG. 1.

Referring to FIG. 1 again, the cycle shifter 50 cycle-shifts to the left data of a certain byte number put in under control of the align control 90, picks up data of upper 8 bytes from the shifted data and feeds such picked-up data to the operand control 60 through the line 50A. As shown in FIG. 7, the operand control 60 cuts data at certain byte positions from the data put in through the line 50A in response to fetch mask data of 8 bits fed from the align control 90 through the line 90C, stores them in an operand buffer register 600 (OBR) and feeds them to ALU 70 through the line 60A.

As shown in FIG. 2, the fetch mask data is given through a line 96A and a fetch mask register 97 (FMARK REG) from a mask pattern determining circuit 96 (MPDCKT). The circuit 96 responds to the output of a fetch data length determining circuit 91 (FDLDCKT) for determining the length of data to be read out and the output of lower 4 bits in OAR 24, and puts out a fetch mask pattern under control of the align field 806 in CR 800, which is given through the line 80A.

FDLDCKT 91 responds to the outputs of LFR 22 in the instruction unit 20 and WR 72 in ALU and determines the fetch data length under control of the align field 806.

Figure 8:
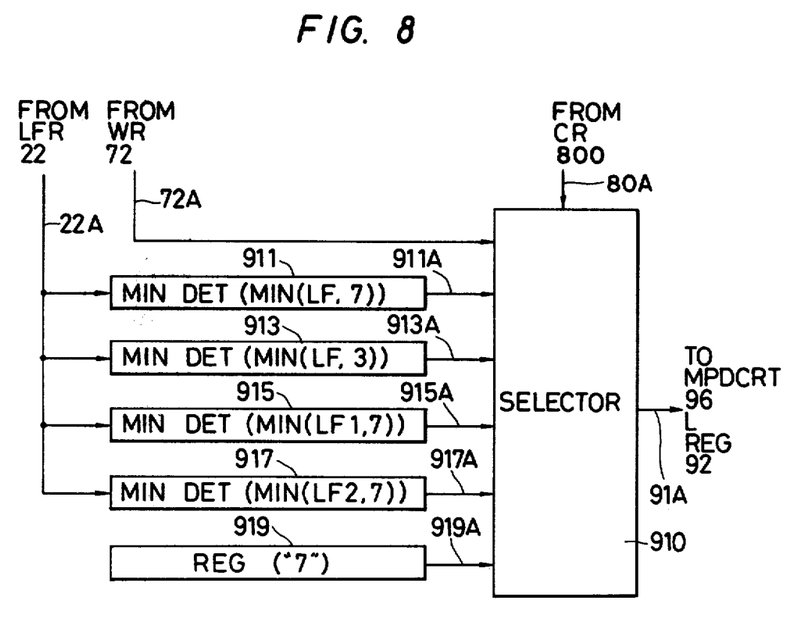
FIG. 8 is a block circuit diagram illustrating in detail the fetch data length determining circuit shown in FIG. 2.

Details of the circuit 91 are illustrated in FIG. 8. As shown in FIG. 8, the circuit 91 comprises minimum value detecting circuits 911, 913, 915 and 917 (MIN DET), a constant register 919 and a selector 910 for selecting one of the outputs of these circuits and register and the output on the line 72A from WR 72. The selector 910 is controlled by the align field 806 in CR 800 through the line 80A. The relation of the content of the align field 806 to the output of the selector 910 is illustrated in FIG. 6. Circuits 911, 913, 915 and 917 are connected to LFR 22 in the instruction unit, and the circuits 911 and 913 compare the entire length LF of data in LFR 22 with "7" and "3", respectively, and put out the smaller value. The circuit 915 compares data LF1 represented by upper 4 bits of the data length LF with "7" and puts out a smaller value. The circuit 917 compares data LF2 of lower 4 bits of the data length LF with "7" and puts out a smaller value.

The circuit 911 is selected when the length of data read out from the buffer memory 40 is restricted below 8 bytes, for example, in case of MVC instruction. The circuit 913 is selected when the length of data read out from the buffer memory 40 should be below 4 bytes. In the present embodiment, the circuit 913 is selected when an instruction requiring overlap processing is practiced. The circuits 915 and 917 are selected in case of decimal operational instructions, and they are used for reading out the first and second operands, respectively. REG 919 is selected in case of, for example, interruption processing, and is used for reading out data of 8 bytes irrespectively of the content of LFR 22. The line 72A is selected when the read-out data length is determined with an optional value in WR 72.

Figure 9:
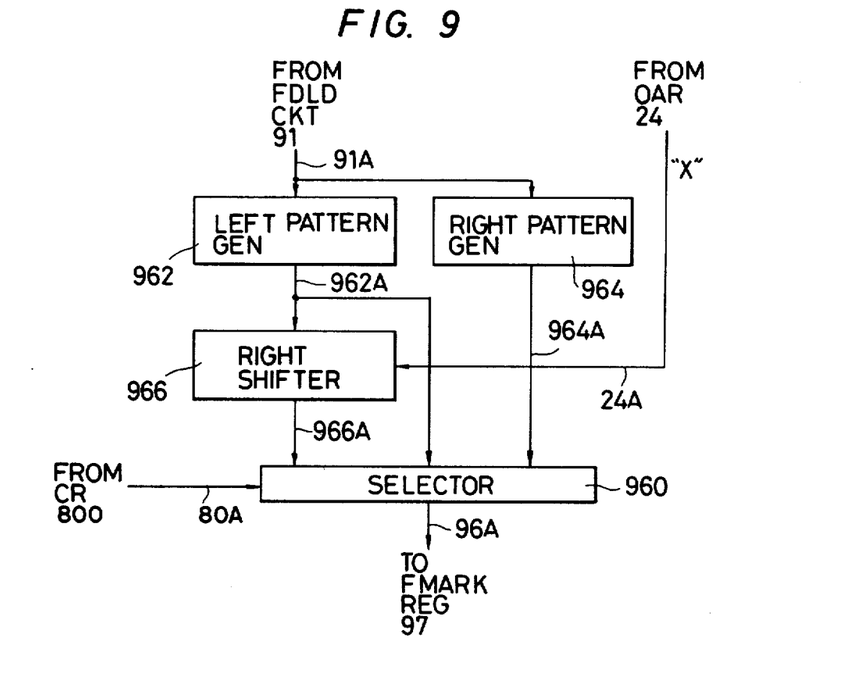
FIG. 9 is a block circuit diagram illustrating in detail the mask pattern determining circuit shown in FIG. 2.
Figure 10:
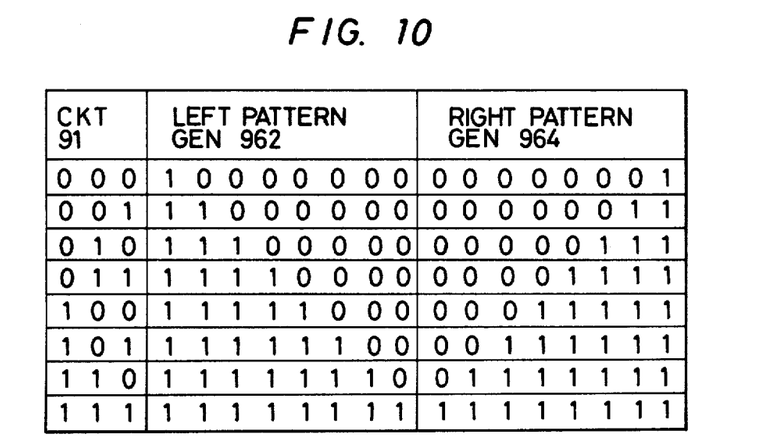
FIG. 10 is a diagram illustrating mask patterns generated by the left pattern generator and right pattern generator shown in FIG. 9.

Details of MPDCKT 96 are illustrated in FIG. 9. As shown in FIG. 9, MPDCKT 96 comprises left and right pattern generators 962 and 964 in which the output of FDLDCKT 91 is put through the line 91A, a right shifter 966 for shifting the output of the left pattern generator 962 by a value represented by the data of lower 4 bits in OAR 24, which is given on the line 24A, and a selector 960 for selecting one of the outputs of the generators 962 and 964 and the right shifter 966. This selector 960 is controlled by the align field 806 in CR 800, which is given on the line 80A. As shown in FIG. 10, the generators 962 and 964 put out data of 8 bits having "1" corresponding to addition of 1 to the fetch data length put out from FDLD CKT 91 on the left and right sides, respectively.

The output of the selector 960 is supplied to REG 97 (see FIG. 2) through the line 96A and stored therein. The output of FMARK 97 is fed to eight gates 62 in the operand control 60 shown in FIG. 7. By putting off gates corresponding to "0" among the outputs of the selector 960, all the byte numbers of 1 put in these gates are changed to "0", and by putting on gates corresponding to "1", the byte numbers of 1 put in these gates are allowed to pass through these gates. Thus, data in which only the byte on a desired column number is significant and all the other bytes are "0" are stored in OBR 600.

The data thus stored in OBR 600 are fed to ALU through the line 60A.

When the entire length LF of data to be read out is less than 8 bytes, read-out of the data appointed by the first operand physical address is completed by one read-out operation described above. However, when the entire length LF exceeds 8 bytes, the foregoing read-out operation is repeated until all the data having an entire length LF are read-out. In other words, the instruction unit subtracts the length of the read-out data from the value in LFR 22. When the resulting content of LFR is not negative, read-out of data is conducted again by using the contents of LFR 22 and OAR 24 and repeated until the content of LFR is negative.

During reading-out of data from the buffer memory 40, the instruction unit 20 feeds out the first operand virtual address stored in OAR 24 (see FIG. 2) into the address control 30. In the same manner as described hereinbefore, this address control generates a physical address for the first operand. When the instruction being practiced requires data at the physical address for the first operand in the buffer memory 40 to be read out, according to the same procedures as described hereinbefore, the read-out operation is conducted. In the address control 30 shown in FIG. 3, this first operand address is stored in a destination address register 39 (DAR). Then, desired operation is conducted on these two items of data in ALU 70, and the result of the operation is stored in the first operand physical address positions in the main memory 10 and buffer memory 40.

When the instruction being executed does not require reading-out of the data to the first operand address, as in the case of MVC instruction, data read out by using the second operand physical address is allowed to pass through ALU 70 and are stored in the first operand physical address positions in the main memory 10 and the buffer memory 40 through the line 70A.

In each case, the store address is fed to one of the first and second banks 42 and 44 from DAR 39 in the first control 30 through the line 30C. When the lower fourth bit of this store address is "0" or "1", this store address is selectively fed to the first or second bank 42 or 44. For simplification, the gate circuit for controlling this selective operation is not illustrated in the drawings.

For better understanding of the foregoing embodiment, a specific example will now be described.

MVC instructions are processed in this example. Data "X" and "Y" represented by the lower 4 bits of the first and second operand addresses are "2" and "6", respectively, according to the decimal notation, and the entire data length LF is "8" according to the decimal notation. Accordingly, the entire length of data to be read out is 9 bytes.

The OP code of MVC instruction is fed to the control storage 80 from the instruction unit 20 and for execution of this instruction, the initial microinstruction of the microinstruction sequence is read out on CR 800, and then, microinstructions in this sequence are read out in a predetermined order to execute this instruction. The instruction unit 20 judges whether or not word overlap processing is necessary for practice of this MVC instruction, and the result of the judgment is transferred to the control storage 80. According to this result, the control storage 80 divides the microinstructions in different branches.

When it is judged that the MVC instruction does not require overlap processing, data "0101" is stored in the align field of the subsequent microinstruction branch. This align field is decoded by the decoder 98 on reading out data from the memory 10. The decoding result is "0" as shown in FIG. 6. This result is fed to the address control 30 through the line 90A. The address control 30 generates a second operand physical address by using this decoding result and a second operand virtual address from OAR 26, and data of 16 bytes including data of 8 bytes with this second operand physical address being as the leftmost address are read out from the buffer memory 40.

In SHBD CKT 93 in the align control 90, the selector 930 puts out data "Y−X", that is, the difference between the second and first operand virtual addresses, in response to the align data "0101". In this example, this value is "4". This output "4" is stored in SHB REG 94 and is then fed to the shift control circuit 95. The data of 16 bytes read out from the buffer memory 40 are cycle-shifted to the left in a quantity corresponding to 4 bytes under control of the shift control circuit 95 by the cycle shifter 50. Accordingly, a part of the data appointed by the second operand address is included in the data put out from the cycle shifter 50 in the region of from the 3rd byte from the left to the 8th byte from the left, that is, 6 bytes as a whole. Of the data put out from the cycle shifter 50, two bytes on the left side are data unnecessary for practicing the present macroinstruction.

In FDLK CKT 91 in the align control 90, as shown in FIG. 6, the selector 910 responds to the align data "0101" and selects the output line 911A of MIN DET 911. Since "8" is put in MIN DET 911 from LFR 22, the output of this circuit 911 is "7". This output is fed to the pattern generators 962 and 964 in MPD CKT 96. The selector 960 in MPD CKT 96 selects the output line 966A of the right shifter 966 in response to the align data "0101" as seen from FIG. 6. The left pattern generator 962 reponds to the input data "7" ("111" according to the binary notation) and puts out a pattern of "11111111" as is seen from FIG. 10. The right shifter 966 shifts to the right this pattern by a number (2 in this example) of the data represented by the lower 4 bits of the first operand virtual address, which is given from OAR 24, and puts out a pattern of "00111111".

The operand control 60 cuts the first and second bytes alone from the output of 8 bytes from the cycle shifter 50 in response to the above-mentioned 8-bit pattern from the align control 90, and stores data of the remaining 6 bytes in OBR 600. Thus, data of 7 bytes as a whole, including data of 6 bytes beginning from the second operand address and other data of "0", are stored in OBR 600.

Then, the instruction unit 20 reduces the LF value in LFR 20 to "2", a value obtained by subtracting "6" from "8", and increases the value in each of OAR's 24 and 26 to "6". Read-out of data is carried out in the same manner as described above by using renewed contents of LFR and OAR.

Processing of MVC instructions not requiring overlap processing is carried out according to the read-out procedures described above.

In case of MVC instructions requiring overlap processing, data "0001" is stored in the align field 806 in the subsequent microinstruction branch. The selector 910 (see FIG. 8) selects the output of the circuit 913 and puts out this output as the read-out data length. The selector 930 (see FIG. 5) in SHBD CKT 93 puts out data "Y". The shift control circuit 95 controls the cycle shifter 50 to put out the output of the buffer memory 40 without shifting or with 8-byte shifting depending on whether "Y" corresponds to "0000" or "1000". In principle, other operations are similar to those in the case where overlapping processing is not required. Accordingly, explanation of these operations is omitted.

Operations of the present embodiment in case of processing of decimal operational instructions will now be described.

In the microinstruction sequence for reading out data represented by the second operand address, "1110" is stored in the align field. Accordingly, the selector 910 selects the line 917A in which binary data corresponding to "3" is put from the circuit 917. Therefore, the second operand of a length of 4 bytes from the second operand address is read out from data in the buffer memory 40. This second operand is cycle-shifted to the left in a quantity corresponding to data "Y+9" by the cycle shifter 50. The data from the selector 930 is put in SHBD CKT 93 shown in FIG. 5. This data "Y+9" is necessary and sufficient for putting out from the cycle shifter 50 data of 8 bytes with the second operand address being as the rightmost address among data of 16 bytes read out from the buffer memory 40. This data of a length of 8 bytes is fed to the operand control 60. The selector 960 (see FIG. 9) in this circuit 60 selects and puts out the output of the right pattern generator 964. Accordingly, in the operand control 60, of data of 8 bytes with the second operand address being as the rightmost address, data including significant data of the same byte number as the fetch data length put out by the selector 910 (see FIG. 8) and other data of "0" are put. These data are then fed to ALU 70. Then, the first operand address is fed to the address control from the instruction unit 20, and as in case of the second operand, the first operand address is generated and read-out of data is performed. In this case, the first operand address is stored also in DAR 39 (see FIG. 3). Data "1101" is stored in the align field in the microinstruction sequence for processing of this first operand. Accordingly, the selector 930 (see FIG. 5) puts out data "X+9", and as in case of the second operand, the cycle shifter 50 and operand control 60 are controlled by the align control 90. The first operand read out and the second operand read out previously are subjected to predetermined operation in ALU 70 and then, they are stored in the buffer memory 40 and the main memory 10. The store address at this point is fed from DAR 39 in the address control 30. Thus, processing of a decimal operation instruction is completed.

As will be apparent from the foregoing illustration, according to the present invention, there is provided a very simple data processing system where positioning and pick-up of data necessary for processing of various instructions can be accomplished by using the known microinstruction control technique. Of course, the scope of the present invention is not limited by the foregoing embodiment, but the invention includes various modifications that can be made with ease by those skilled in the art without departing from the scope defined by claims given hereinafter. For example, according to one modification of the present invention, there is provided a data processing system in which a circuit for controlling positioning and pick-up of data without the use of microinstruction is disposed in the instruction unit and the output of the align control 90 shown in FIG. 1 and the output of this control circuit is changed over with each other to supply outputs to the address control 30, cycle shifter 50 and operand control 60, whereby control of circuits for positioning and pick-up of data can be performed either by microinstructions or by a wired logic circuit.

We claim:

1. A data processing system which comprises:
   (a) instruction means including means for decoding stored macroinstructions in order to generate addresses of operand data to be used in execution of said macroinstructions and a length indication of the entire length of that operand data;
   (b) storage means for storing said operand data including first and second storage means, and means connected to said decoding means for reading out first and second partial operand data in parallel from said first and second storage means, respectively, in response to one of said operand addresses, said first and second partial operand data being located in a continuous address region having a predetermined length in said storage means and being the data specified by said one of said operand addresses;
   (c) positioning means connected to said first and second storage means for selectively positioning data read therefrom;
   (d) operation executing means connected to said positioning means for executing operation on said positioned data;
   (e) control storage means connected to said instruction means for storing microinstruction sequences each corresponding to one of said macroinstructions for executing said macroinstructions, each microinstruction sequence including a plurality of microinstructions having a control field for controlling said operation executing means and said storage means so that operations specified by said decoded macroinstructions are executed on operands specified by said operand addresses, each microinstruction further including an align field for controlling said positioning means; and
   (f) align control means including first means connected to said decoding means for generating a plurality of shift numbers, at least some of said shift numbers depending on said one of said operand addresses; selecting means connected to said first means for selecting one of said shift numbers in response to said align field; second means connected to said first and second storage means for cycle-shifting said first and second partial operand data in combination by an amount equal to said selected shift number; third means for outputting a plurality of mask pattern signals for indicating a part of said cycle-shifted data to be masked in response to said length indication of the entire length of said operand data, at least one of said mask pattern signals depending on said one of said operand addresses; fourth means for selecting one of said mask pattern signals in response to said align field; and fifth means for masking said cycle-shifted data in response to said selected mask pattern signal.

2. A data processing system as set forth in claim 1 wherein said decoding means determines addresses of first and second operand data to be used in execution of said macroinstruction and the length indication of said first and second operand data, means responsive to said first operand data address for reading out said first operand data from said storage means, and means responsive to said second operand data address for storing said second operand data therein, and wherein said first means includes means for calculating the difference between said second operand data address and said first operand data address as one of said shift numbers.

3. A data processing system as set forth in claim 1 wherein said instruction means includes determining means for determining the length of said operand data to be read out from said storage means at the subsequent read-out operation in response to said microinstruction align field, and said third means includes means for providing different mask pattern signals in response to different outputs of said determining means.

4. A data processing system as set forth in claim 3 wherein said determining means includes means connected to a plurality of comparing means connected to said decoding means to select one of said comparing means in response to said align field, and each of said comparing means being arranged so that when said comparing means is selected by said selecting means, according to the result of a comparison of said length indication of the entire length of said operand data with a predetermined value, said comparing means interchanges said length indication and said predetermined value and puts out either said length indication or said predetermined length as said read-out data length.

5. A data processing system as set forth in claim 4 wherein each of said comparing means includes means for comparing the value of said length indication with said predetermined value and for outputting the smaller of the two said values.

6. A data processing system as set forth in claim 3 wherein said determining means includes a register for storing a predetermined value therein and means for reading out the output of said register in response to a predetermined align field and for putting out selectively the read-out output of said register as said read-out data length.

7. A data processing system as set forth in claim 3 wherein said third means includes sixth means connected to said determining means to generate a data pattern having "1" bits in a number corresponding to the read-out data length on the uppermost side, with the remaining bits being "0", seventh means connected to said determining means to generate a data pattern having "1" bits in a number corresponding to the read-out data length on the lowermost side with the remaining bits being of "0", eighth means connected to one of said sixth and seventh means to shift the pattern generated thereby in a predetermined direction by a bit number corresponding to a data address determined by said decoding means, and said fourth means including means for selecting one of the outputs of said sixth, said seventh and said eighth means as said mask pattern signal in response to said align field.

8. A data processing system as set forth in claim 2 wherein said first means includes a first selection means for selectively outputting said first and said operand data addresses determined by said decoding means, means for receiving said first data address put therein and outputting a complement of said first data address, a plurality of registers for storing therein predetermined values, a second selection means for selectively outputting one output of said complement output means and the output of said registers, adding means for finding the sum of the outputs of said first and said second selection means and said third selection means for selectively outputting one of the outputs of said adding means and said first selection output means, and said first, said second and said third selection means are arranged so that they are operated in response to predetermined align fields, respectively.

9. A data processing system as set forth in claim 1 wherein said first means includes register means for storing therein a predetermined number, means for adding the output of said register means to the address of said operand data and means for selectively outputting the output of said adding means in response to a predetermined align field.

10. A data processing system as set forth in claim 9 wherein said register means includes a plurality of registers for storing therein a plurality of said predetermined values different from one another, respectively, and means for feeding outputs to said adding means in response to a plurality of said predetermined align fields, respectively.

11. A data processing system as set forth in claim 1 wherein said first means includes means for input of a plurality of predetermined numbers and means for selectively outputting a predetermined number put in by said input means as the shift number in response to a predetermined align field.

12. A data processing system which comprises:
(a) means for storing a plurality of macroinstructions and data;
(b) instruction means for determining a starting address of data participating in the execution of a macroinstruction which is read out from said storing means and for determining a length indication of the entire length of said data in response to said readout macroinstruction;
(c) address control means responsive to addresses from said instruction means for reading out macroinstructions from said storing means to said instruction means for reading out said data from said storing means based on the thus-determined address and entire length of said data;
(d) shifting means connected to said storing means for shifting the read-out data from said storing means by a quantity determined by said macroinstruction;
(e) masking means connected to said shifting means for masking part of said shifted data in accordance with said macroinstruction; and
(f) control storage means connected to said instruction means for storing a microinstruction sequence for controlling execution of said macroinstruction and for putting out in sequence predetermined microinstructions in response to control from said instruction means on the basis of the read-out macroinstruction, said microinstructions including an align field for controlling said instruction means, said shifting means and said masking means;
(g) said shifting means including align control means connected to said instruction means and said control storage means for determining said shift quantity in response to said starting data address as determined by said instruction means and said align field provided in said microinstruction; and
(h) said masking means including means connected to said align control means for putting out mask pattern signals indicating the position of said part of said data to be masked, in response to said length indication of the entire length of said data and said starting address and said align field and means for masking part of the data received from said shifting means on the basis of said masked pattern signals.

* * * * *